US012800541B2

(12) United States Patent
Lawton, Jr. et al.

(10) Patent No.: US 12,800,541 B2
(45) Date of Patent: Nov. 17, 2026

(54) MEASURING GLYCOSYLATION STATE USING PHOTOCURRENT BASED BIOSENSORS

(71) Applicant: Advanced Silicon Group Technologies, LLC, Lincoln, MA (US)

(72) Inventors: Carl William Lawton, Jr., Chelmsford, MA (US); Marcie R. Black, Lincoln, MA (US); Tan Khanh Nguyen Le, Westford, MA (US)

(73) Assignee: Advanced Silicon Group Technologies, LLC, Lowell, MA (US)

( * ) Notice: Subject to any disclaimer, the term of this patent is extended or adjusted under 35 U.S.C. 154(b) by 150 days.

(21) Appl. No.: 19/038,953

(22) Filed: Jan. 28, 2025

(65) Prior Publication Data

US 2025/0264435 A1 Aug. 21, 2025

Related U.S. Application Data

(60) Provisional application No. 63/554,652, filed on Feb. 16, 2024.

(51) Int. Cl.
*G01N 27/327* (2006.01)
*G01N 27/30* (2006.01)

(52) U.S. Cl.
CPC ....... *G01N 27/3278* (2013.01); *G01N 27/305* (2013.01); *G01N 2333/42* (2013.01)

(58) Field of Classification Search
None
See application file for complete search history.

(56) References Cited

U.S. PATENT DOCUMENTS

| | | | |
|---|---|---|---|
| 8,143,143 B2 | 3/2012 | Buchine et al. | |
| 8,450,599 B2 | 5/2013 | Buchine et al. | |
| 8,852,981 B2 | 10/2014 | Black et al. | |
| 10,079,322 B2 | 9/2018 | Black et al. | |
| 2009/0256134 A1 | 10/2009 | Buchine et al. | |
| 2017/0052182 A1 | 2/2017 | Black et al. | |
| 2022/0223750 A1 * | 7/2022 | Buchine .............. | H10F 77/1437 |

OTHER PUBLICATIONS

Debray et al., "Specificity of Twelve Lectins Towards Oligosaccharides and Glycopeptides Related to N-Glycosylproteins," Eur. J. Biochem., 117, 41-55 (1981).
Franssila, "Introduction to Microfabrication," 2d. ed., John Wiley & Sons, 2010.
Galinski et al., "Agglomeration of Pt thin films on dielectric substrates," Phys. Rev. B, 82, 235415 (2010).
Green et al., "Oligosaccharide Specificities of Phaseolus vulgaris Leukoagglutinating and Erythroagglutinating Phytohemagglutinin," J. Biol. Chem., 262, 12018-12029 (1987).
Hirabayashi et al., "Lectin Microarrays: Concept, Principle, and Applications," Chemical Society Reviews, 42(10), 4443-4458 (2013).
(Continued)

*Primary Examiner* — J. Christopher Ball
(74) *Attorney, Agent, or Firm* — Lando & Anastasi, LLP

(57) ABSTRACT

Aspects and embodiments disclosed herein include a biosensor lectin sensor that uses a photoelectric effect to determine the presence of glycoproteins.

18 Claims, 9 Drawing Sheets

(56) References Cited

OTHER PUBLICATIONS

Ikizer et al., "Formation of Poly(para-phenylene) Fibers," Materials Engineering and Sciences, presented at the 2018 Annual AlChE Conference, Pittsburgh, PA, Oct.-Nov. 2018.
Ino, "Epitaxial Growth of Metals on Rocksalt Faces Cleared in Vacuum. II. Orientation and Structure of Gold Particles Formed in Ultrahigh Vacuum," Journal of the Physical Society of Japan, vol. 21, No. 2, Feb. 1966.
Itakura et al., "Systematic Comparison of Oligosaccharide Specificity of Ricinus communis Agglutinin I and Erythrina Lectins: A Search by Frontal Affinity Chromatography," J. Biochem. (Tokyo), 142, 459-469 (2007).
Konstantinov et al., "White Paper on Continuous Bioprocessing," Journal of Pharmaceutical Sciences, vol. 104, pp. 813-820 (2015).
Li et al., "Recent Advances in the Fabrication and Detection of Lectin Microarrays and Their Application in Glycobiology Analysis," Analytical Methods, 6(7), 2003-2014 (2014).
Liu et al., "Efficient SERS substrates made by electroless silver deposition into patterned silicon structures," J. Mater. Chem., 14, 1526-1532 (2004).
Muller et al., "Device electronics for integrated circuits." (1986): 54, Third Edition.
Pashley et al., "The growth and structure of gold and silver deposits formed by evaporation inside an electron microscope," Phil. Mag., 10:103, 127-158 (1964).
Posey JR. et al., "Engineered CAR T Cells Targeting the Cancer-Associated Tn-Glycoform of the Membrane Mucin MUC1 Control Adenocarcinoma," Immunity, Jun. 21, 2016; 44(6): 1444-1454.
Sawyer et al., "Biomanufacturing Technology Roadmap—Overview," Biomanufacturing Technology Roadmap, BioPhorum Operations Group Ltd, 2017.
Shibuya et al., "Carbohydrate Binding Properties of the Stinging Nettle (*Urtica dioica*) Rhizome Lectin," Arch. Biochem. Biophys., 249, 215-224 (1986).
Somasundaram et al., "Progression of Continuous Downstream Processing of Monoclonal Antibodies: Current Trends and Challenges," Biotechnology and Bioengineering, 115(12), 2893-2907 (2018).
Weste et al., Principles of VLSI Design: A Systems Perspective (2nd ed., 1985).

* cited by examiner

| Lectin | Monosaccharide specificity | Preferred glycan structure (terminal epitope) |
| --- | --- | --- |
| PHA-E (Phaseolus vulgaris) | Gal | N-glycans with outer Gal |
| RCA120 (Ricinus communis) | Gal | Galβ4GlcNAc |
| STL (Solanum tuberosum) | GlcNAc | (GlcNAcβ) |
| UDA (Urtica dioica) | GlcNAc | GlcNAcβ4GlcNAc |

Figure 4

MEASURING GLYCOSYLATION STATE USING PHOTOCURRENT BASED BIOSENSORS

CROSS-REFERENCE TO RELATED APPLICATIONS

This application claims priority under 35 U.S.C. § 119 (e) to U.S. Provisional Patent Application Ser. No. 63/554,652, titled "MEASURING GLYCOSYLATION STATE USING SILICON NANOWIRE ARRAY BIOSENSORS," filed Feb. 16, 2024, the entire content of which is incorporated herein by reference for all purposes.

BACKGROUND

Society is at the beginning stages of a paradigm shift in the manufacture of biologic medicines that will utilize integrated continuous biomanufacturing. Integrated continuous biomanufacturing is biomanufacturing that is totally continuous from inoculation to harvest, integrating traditionally labeled "upstream" and "downstream" into one process. This shift will lead to lower cost, higher quality and more widely available medicines to treat chronic diseases such as cancer, kidney disease, diabetes, cystic fibrosis, and autoimmune disorders. The biologics market is large and growing ($460+ billion market by 2030 [18]). However, many therapies will become inaccessible to many patients because of the high cost. Also, current manufacturing technologies are inflexible and unable to scale in emergencies such as pandemics (COVID19). Integrated continuous biomanufacturing will lower the cost of making new drugs and allow for rapid scale up.

Currently, there are no commercial integrated continuous biomanufacturing systems operating (biopharmaceuticals) despite their known benefits [17]. One of the major challenges is the availability of robust, accurate sensor technology that provides meaningful data which can be used to control unit operations and overall global control.

The industry collaboration BioPhorum has published a series of Roadmaps detailing technology and regulatory gaps that need to be solved before the vision of integrated continuous biomanufacturing will occur. One major gap is sensing.

An important parameter in biomanufacturing is the Glycosylation state, the enzymatic process of attaching oligosaccharides (carbohydrate) to proteins.

Chinese Hamster Ovaries (CHO) are the most common type of cells used for biomanufacturing. About 80% of biomanufacturing uses CHO cells. The oligosaccharides of monoclonal antibodies (mAb), produced using CHO cells, generally terminate with Gal or GlcNAc. The predominate states of CHO cells of a produced mAb are G0F, G1F, or G2F.

From a regulatory perspective, the manufacturer of a mAb must meet their established Critical Quality Attributes (CQAs) that have been shown to be effacious and safe. Industrially produced mAbs are heterogeneous in their glycan makeup. An example distribution of terminal galactose residues might look like: 70% G0F, 28% G1F, and 2% G2F. Monoclonal antibodies produced in CHO cells rarely terminate in N-Acetylneuraminic acid. The glycosylation state of a protein can not be controlled with current manufacturing processes, due to a lack of inline sensors that would allow feedback control of operational parameters. Control of glycosylation state becomes important if the manufacturing process drifts from the product CQA values. Process drift can occur from normal variability, manufacturing change, or introduction of a biosimilar process.

Glycosylation state has only been measured routinely for about 25 years.

The most common method of analysis of mAb glycosylation is by off-line determination by enzymatic hydrolysis followed by High Performance Liquid Chromatography-Mass Spectrometry (HPLC-MS). While sufficient to obtain information on the oligosaccharide that provided the glycosylation of the protein, this method requires sampling the product, removing the product from the manufacturing line, and testing using a large and expensive tool. Thus, this method is low throughput, expensive, and slow.

The standard process requires the oligosaccharide that provided the glycosylation to the protein be isolated from any attached proteins.

A promising newer technique makes use of lectin microarrays [15, 16]. Lectins are proteins which bind to selective glycosylation states. All of the lectin microarrays proposed require the use of a fluorescent dye or tag. In addition, these measurement techniques require expensive and complicated detection systems. Lectin microarrays can potentially replace the time consuming traditional HPLC-MS analysis procedure. In addition, unlike HPLC-MS, intact proteins can be analyzed for glycosylation without removal of the oligosaccharide. However, the use of a fluorescent dye with these methods adds to the cost and complexity of the process both in the sample preparation and in requiring the testing to use an optical measurement system.

U.S. patent application Ser. No. 15/243,099 (publication number US2017/0052182 A1) teaches using vertically aligned silicon nanowire arrays for the detection of protein and DNA concentrations. Silicon nanowire biosensors have been developed which use receptors, antibodies, and/or nucleic acid sequences that specifically bind to proteins and/or complementary DNA which are biomarkers. This sensor device requires the biomarker of interest to have an electrical charge which then modifies the photocurrent of the p-n junction.

The silicon nanowire biosensor is effectively a solar cell where the semiconductor surface is only mildly electrically passivated. A p-n junction diode is below the nanowire array. When light is irradiated onto the sensor surface, the light is absorbed, and the absorbed energy excites free carriers. The free carriers (an electron and a hole) will either be extracted out of corresponding electrical contacts and create photocurrent, or they will recombine. The surface of the nanowire is very effective at allowing the free carriers to recombine and thus not contribute to photocurrent.

When the surface is well passivated, the free carriers are less likely to recombine at the surface and hence the photocurrent is larger. When a protein is attached to the surface of the silicon, the electrical charge of that protein will repel free carriers with like charges and thus partially passivate the nanowire surface, hence increasing the photocurrent. See FIGS. 1*a*-1*d*. Using this method, the photocurrent is used to measure the amount of protein binding to the surface of the sensor and hence the concentration of the solution.

Scanning electron microscopy images are shown of nanowire arrays in FIGS. 2*a* and 2*b*, wherein FIG. 2*a* is a top view and FIG. 2*b* is a cross-sectional view of the wires.

SUMMARY

Aspects and embodiments disclosed herein include a photocurrent based biosensor that can measure the glycosylation state of a solution such as monoclonal antibodies, and more generally, that can measure biomarkers that are not electrically charged using silicon biosensors. Embodiments of the disclosed sensor may make use of lectins instead of antibodies for detection of biomarkers.

In accordance with one aspect, there is provided a lectin biosensor that uses a photoelectric effect to determine the presence of glycoproteins.

In some embodiments, the biosensor includes a p-n junction.

In some embodiments, the biosensor further comprises nanowires in a vertically aligned array.

In some embodiments, the p-n junction is made out of silicon.

In some embodiments, the device is functionalized with lectins that selectively attach a glycoprotein of interest.

In some embodiments, the glycoprotein of interest exhibits a glycosylation state of one of G0F, G1F, or G2F.

In some embodiments, the biosensor includes subsections which are functionalized to detect different glycosylation states of interest.

In accordance with another aspect, there is provided a method of using the biosensor, wherein electrical measurements of each of the subsections are used in combination to determine a concentration of the glycoprotein of interest.

In accordance with another aspect, there is provided a biosensor which uses photocurrent to determine a presence of uncharged molecules of interest by coupling the uncharged molecules with a charged molecule.

In some embodiments, the uncharged molecules are oligosaccharides.

In accordance with another aspect, there is provided a sensor device. The sensor device comprises at least two electrical contacts, and silicon material including one region doped with p-type dopants and another region doped with n-type dopants, thus forming a p-n junction, the sensor device functionalized on a surface of the silicon material so that a passivation state of the surface of the silicon material is modified when a sample having a specific glycosylation state is present in contact with the surface of the silicon material as opposed to a passivation state of the surface of the silicon material exhibited in an absence of the sample having the specific glycosylation state.

In some embodiments, a portion of the silicon material includes an array of nanowires.

In some embodiments, at least one of the n-type or p-type dopants are present in a concentration of one of $10^{17}$ $cm^{-3}$, $10^{16}$ $cm^{-3}$, or $10^{15}$ $cm^{-3}$.

In some embodiments, the device is functionalized with lectins that selectively attach a glycoprotein of interest.

In some embodiments, the glycoprotein of interest exhibits a glycosylation state including one of G0F, G1F, or G2F.

In some embodiments, subsections are created on the sensor which are functionalized to detect different glycosylation states of interest.

In accordance with another aspect, there is provided a method of using the sensor device, wherein electrical measurements of each of the subsections are used in combination to determine a concentration of the glycoprotein of interest.

In accordance with another aspect, there is provided a method of using the sensor device, by measuring electrical properties of the sensor device with and without light to determine the presence of specific glycoproteins.

BRIEF DESCRIPTION OF THE FIGURES

FIG. 4 is a table of different lectins and the monosaccharide that they are specific to. The literature for this information is in reference [19].

DETAILED DESCRIPTION

Aspects and embodiments disclosed here are not limited to specific solvents, materials, or device structures, as such may vary. It is also to be understood that the terminology used herein is for the purpose of describing particular embodiments only, and is not intended to be limiting.

Where a range of values is provided, it is intended that each intervening value between the upper and lower limit of that range and any other stated or intervening value in that stated range is encompassed within the disclosure. For example, if a range of 1 μm to 8 μm is stated, it is intended that 2 μm, 3 μm, 4 μm, 5 μm, 6 μm, and 7 μm are also disclosed, as well as the range of values greater than or equal to 1 μm and the range of values less than or equal to 8 μm.

In an aspect of the disclosure, a process for using silicon nanowire biosensors to measure the glycosylation state of a sample is provided.

Aspects and embodiments of biosensors as disclosed herein may include a silicon die with a nanostructured surface formed in a manner similar to that described in, for example, U.S. patent application Ser. No. 15/243,099 and publication number US20170052182A1. The nanostructured surface may include nanowires formed by a metal enhanced etching process performed on a lightly boron doped silicon wafer. A p-n junction is formed within a bulk portion of the wafer below bases of the nanowires using a diffusion process to diffuse phosphorus dopants into the bulk portion of the wafer. Next, electrical contacts are evaporated using a comb shaped mask on the nanowire surface and a uniform metal is evaporated on the back surface of the wafer. The nanostructures/nanowires are then functionalized using a (3-Aminopropyl) triethoxysilane (APTES) chemistry. If desired for a particular implementation, alternative functionalization chemistry (such as (3-Glycidyloxypropyl) trimethoxysilane can be used.

Next, instead of antibodies, lectins are attached to the silicon surface using the APTES chemistry. Lectins selectively bind to specific glycosylation states, but most protein glycans do not have an electrical charge and hence their presence on the surface will not result in a change in photocurrent due to an electrical charge present.

Figure 1A:
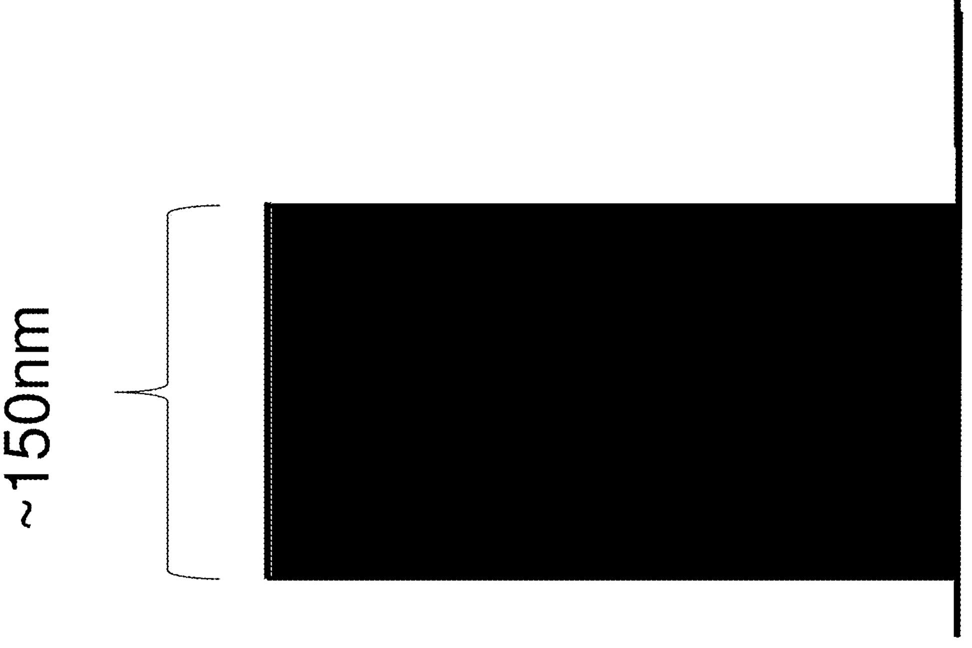
FIGS. 1*a*-1*d* depict a nanowire (FIG. 1*a*) and the corresponding photocurrent (FIG. 1*b*) when a charge is not present (FIG. 1*c*) and then when a charge is present (FIG. 1*d*).
Figure 1C:
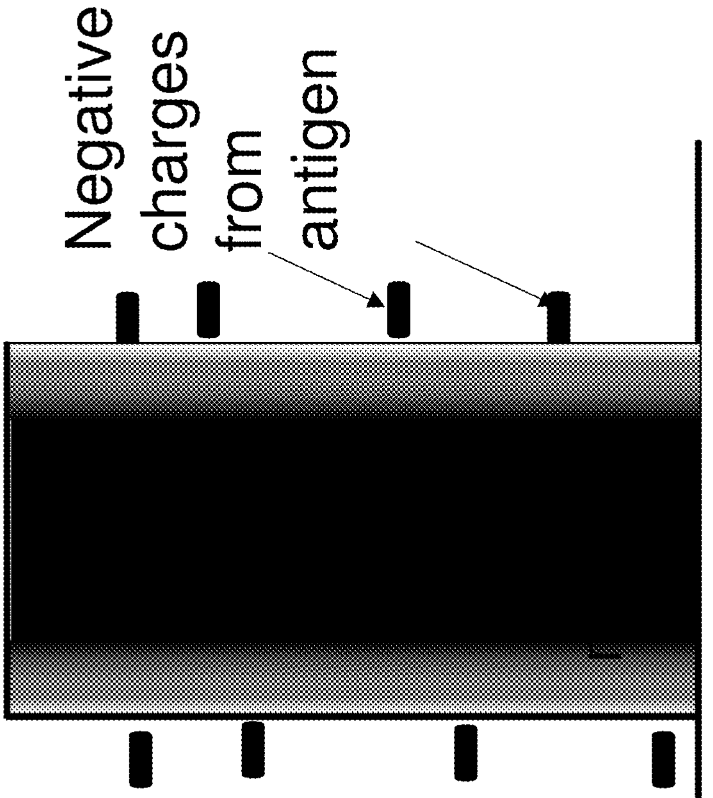
Figure 1B:
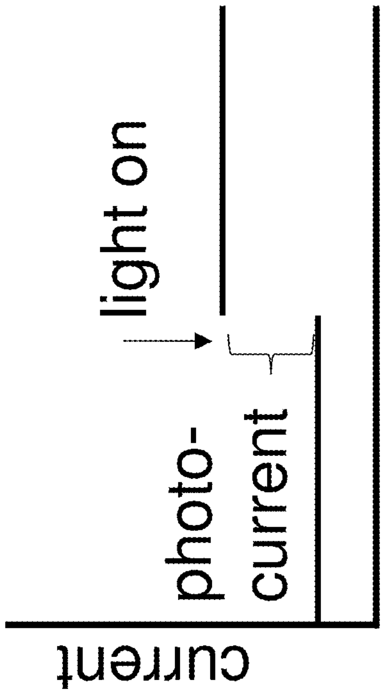
Figure 1D:
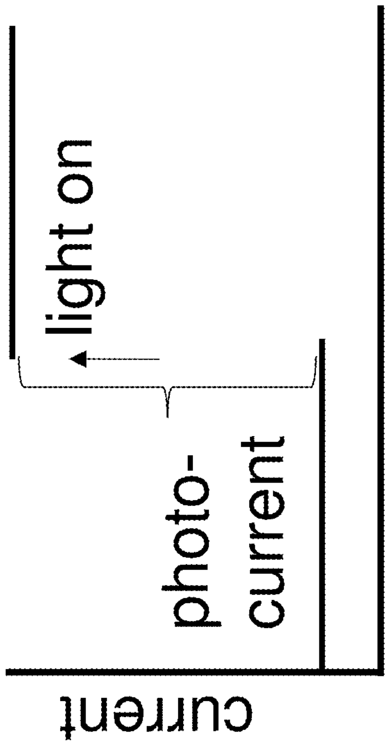
Figure 2A:
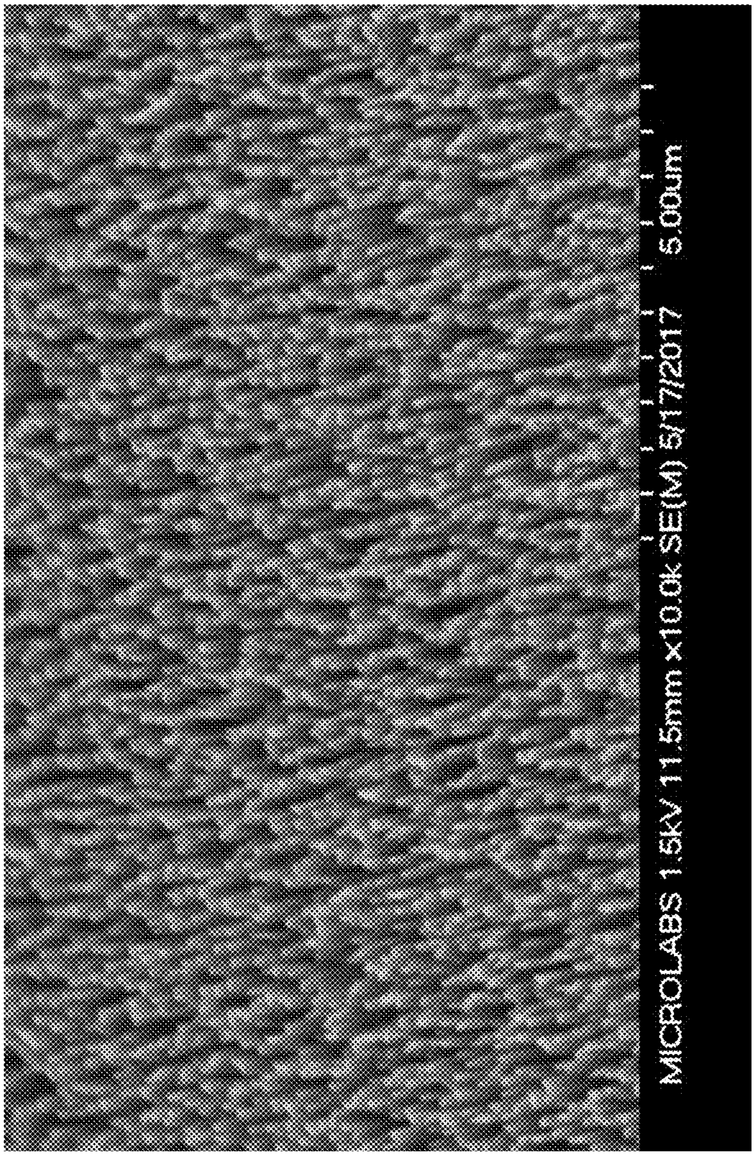
FIGS. 2*a* and 2*b* are scanning electronic microscope images of a top view (FIG. 2*a*) and a cross-sectional view (FIG. 2*b*) of a silicon nanowire array.
Figure 2B:
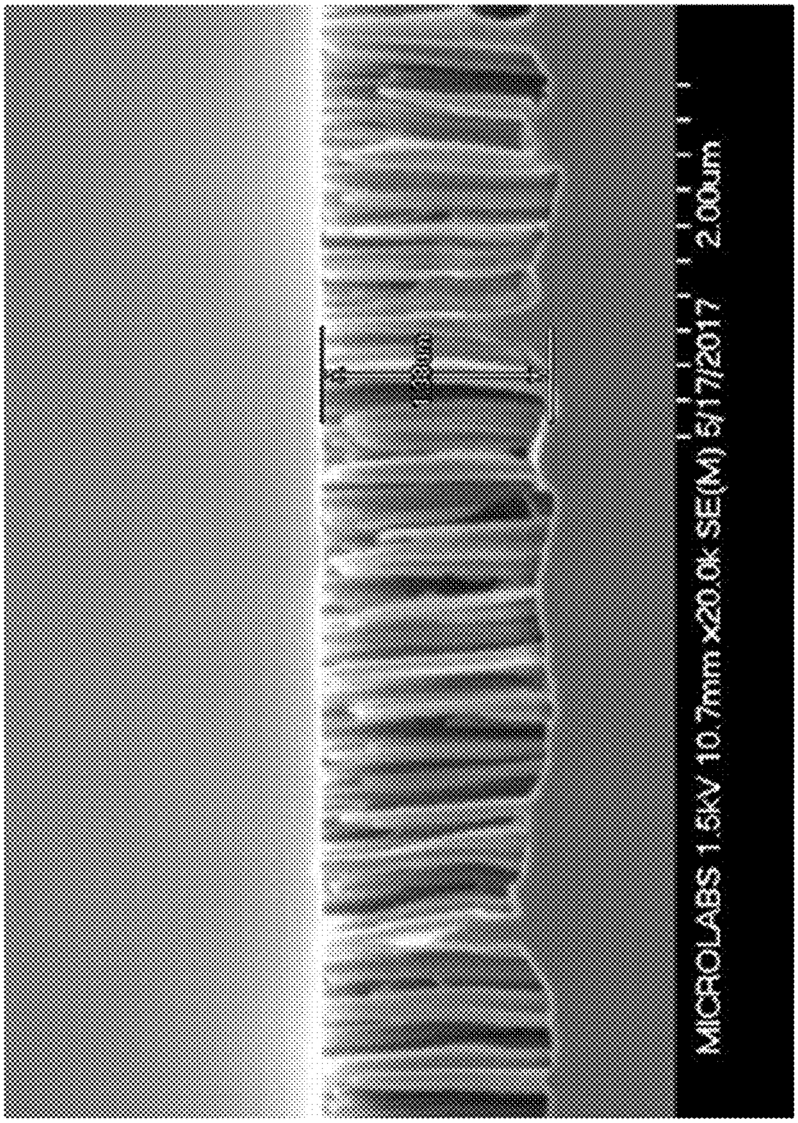
Figure 3:
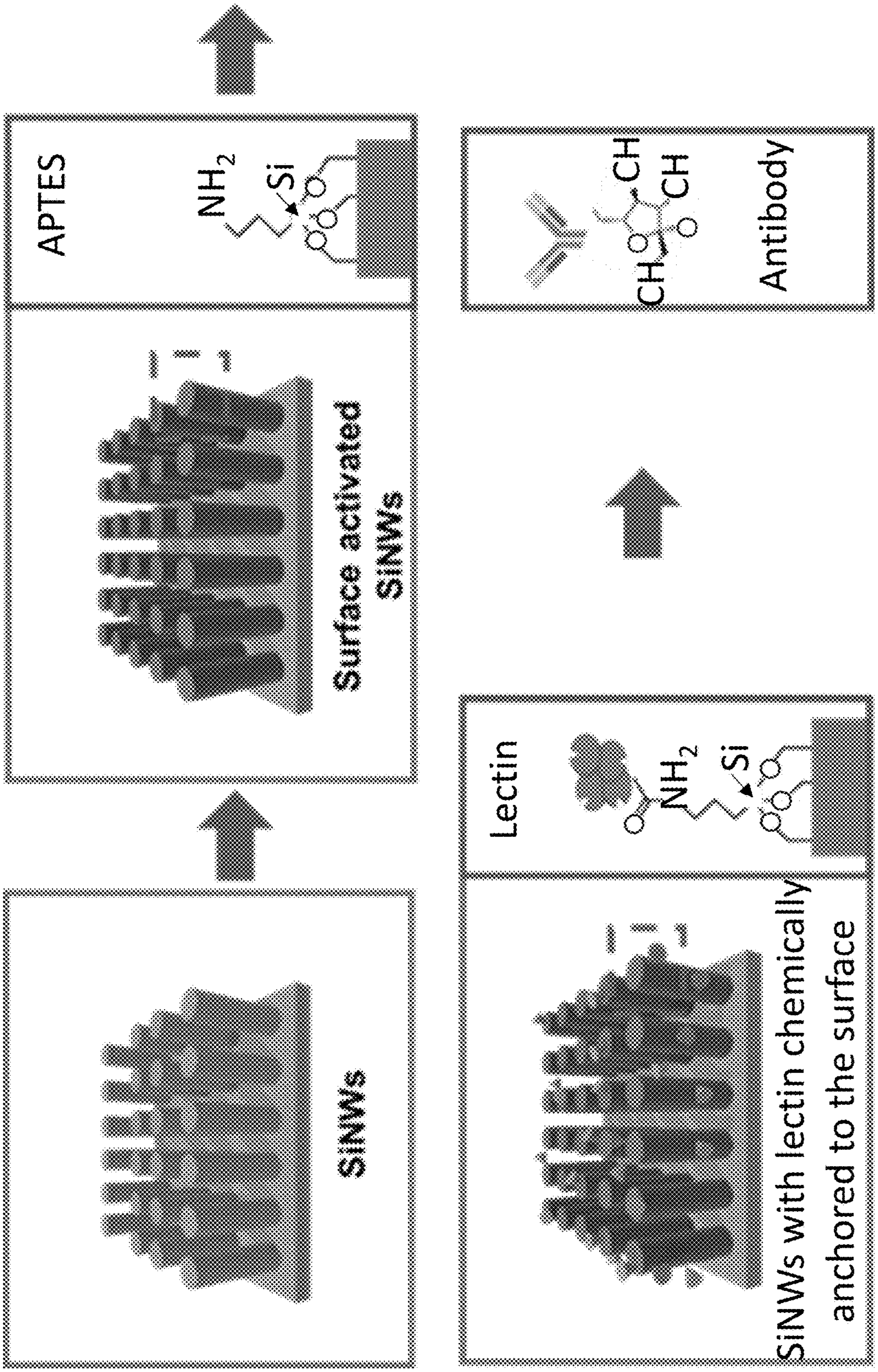
FIG. 3 is a schematic of a functionalization process using lectins.
Figure 5:
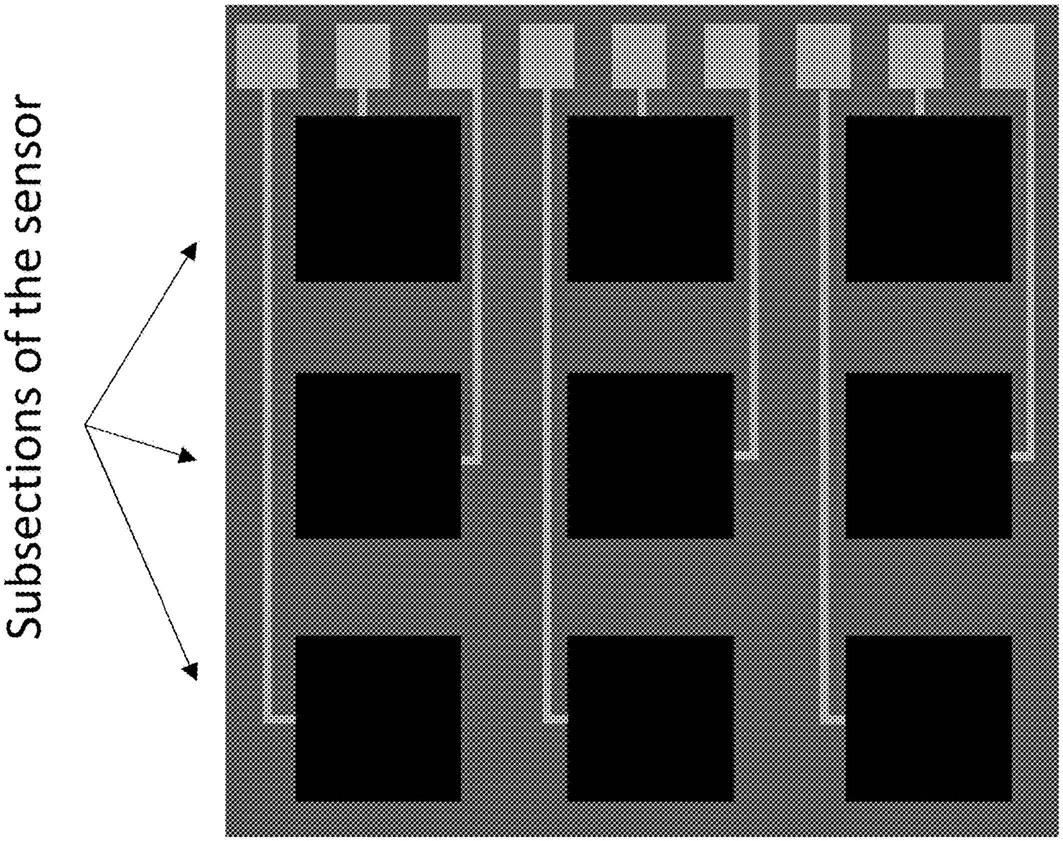
FIG. 5 schematically illustrates a sensor with nine subsections each having a separate electrical connection and contact pads.
Figure 6:
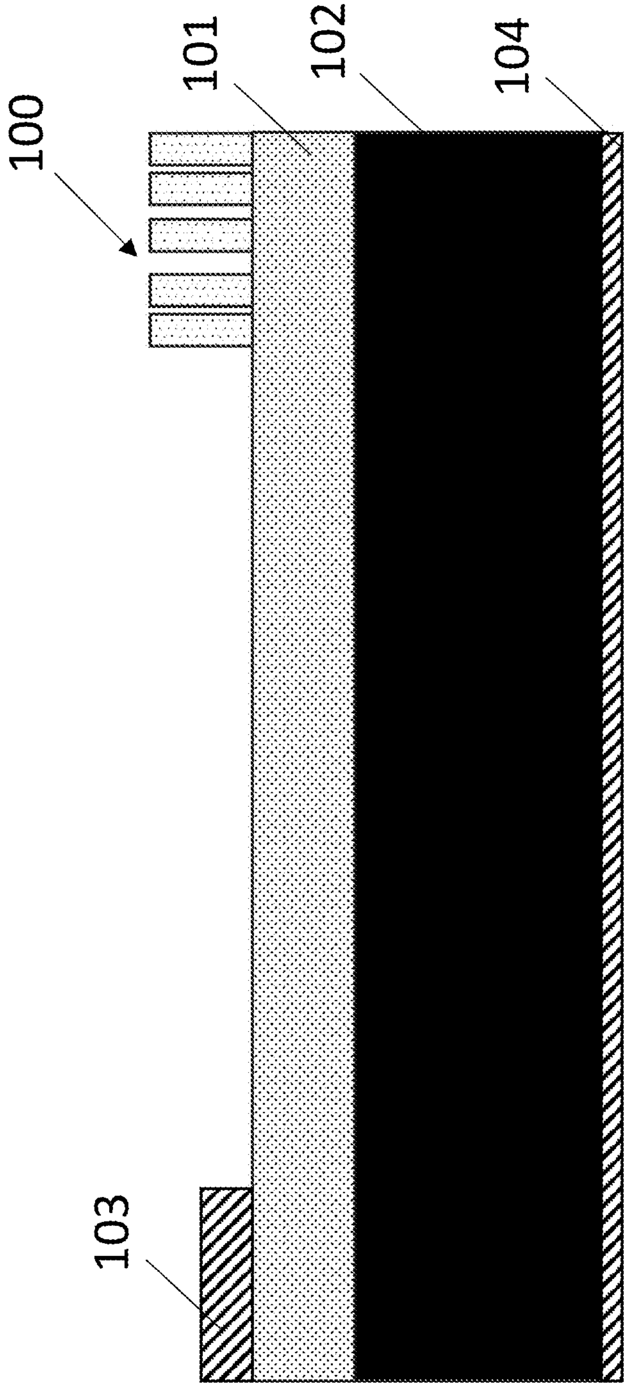
FIG. 6 is cross-sectional schematic of a sensor made from a silicon chip with nanowires 100 on part of the surface that are p-type doped, a p-type doped silicon section 101, an n-type doped silicon section 102, a top electrical connection, 103, and a back electrical connection 104.
Figure 7:
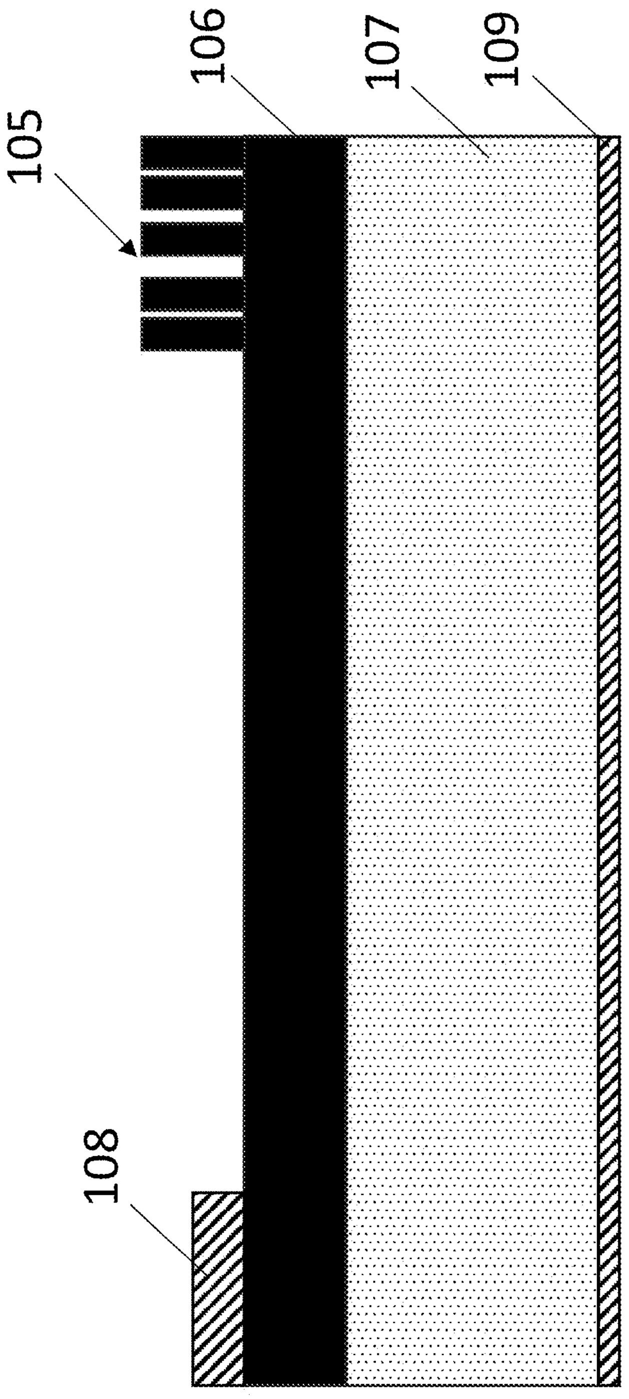
FIG. 7 is a cross-sectional schematic of a sensor made from a silicon chip with nanowires 105 on part of the surface that are n-type doped, an n-type doped silicon section 106, a p-type doped silicon section 107, a top electrical connection 108, and a back electrical connection 109.

FIG. 3 shows a schematic of the functionalization process using lectins.

The predominate states of a CHO produced mAb is G0F, G1F, or G2F.

Different lectins can be used to measure these different states. Some example lectins and the glycosylation state that they bind to are shown in FIG. 3. PHA-E, RCA120 are specific to Galactose (Gal). STL and UDA are specific to N-acetyl glucosamine (GlcNAc).

Carbohydrates that have a small charge, but that charge is not large enough for the sensor to detect, or if that charge is the opposite charge type to be detected with a certain sensor can also use aspects and embodiment of sensors as disclosed herein to increase or reverse the charge after binding to a protein.

These lectins can be used in combination or individually. A 100% response on a silicon sensor modified with galactose binding lectin would indicate 100% of the intact mAb would have terminal G2 while silicon sensor functionalized with GlNAc-binding lectin would yield a 0% response. In a similar manner a 0% response on the galactose functionalized silicon sensor and a 100% response on the GlNAc functionalized silicon sensor would indicate 100% of the intact mAb would have terminal G0. Fractional responses (the most likely outcome) would give values, that when compared to HPLC-MS, can then be used to calibrate the sensors. We can use algebra (3 equations and 3 unknowns) to calculate fractional concentrations. The different lectins can be used on separate sensors, on the same sensor but different sub-sensors, or even on the same sensor/sub-sensor if, for example, a combination result is desired.

The individual sensors can be calibrated with standards. The standards' purity can be confirmed by HPLC-MS.

Assays can also be developed so that each sensor has more than one subsensor that has a different lectin present and measures different glycosylation states.

Lectins can be used to selectively bind glycoconjugates including glycosylated proteins, peptides, lipids, and saccharides. Glycoconjugates are formed when carbohydrates are covalently (glycosylation) attached to other chemical species. The photocurrent will be altered when the oligosaccharide is attached to a charged structure.

Carbohydrates on antibodies often have a neutral charge and thus will not alter the photocurrent by themselves. Thus, the silicon sensor design as disclosed in the prior art will not work to measure these carbohydrate states. However, a glycoprotein can have a charge derived from the protein portion of the glycoprotein. When a glycoprotein is used instead of just a carbohydrate, then the lectin binds to the carbohydrate side of the molecule, and the protein provides an electrical charge which can be measured by the sensor. Thus, in this way, neutrally charged carbohydrates can be measured by embodiments of sensors as disclosed herein using the photo-electric effect.

More generally, this method of coupling a charged source with a non-charged biomarker, can be used to measure the non-charged biomarker concentrations or their presence in a solution using methods that require an electric charge.

Exemplary Process 1

A wafer formed of silicon with a resistivity of 1-3 ohm-cm is selected having a surface with a (100) crystallographic orientation and p-type doping.

The wafer is placed into a sputtering chamber for the deposition of a silver layer. The base pressure in the chamber is pumped down to $7.0\times10^{-7}$ Torr and then 19 nm of silver (Ag) is sputter deposited on the front of the wafer at a rate of about 0.7 Å/s at a pressure of 5 mTorr. The thickness of the silver is determined by a crystal monitor. The wafer is then removed from the chamber.

The next step is an etch which uses the silver on the surface of the silicon wafer to form a nanostructured silicon surface. The nanostructure formation occurs in an oxygen/HF bath. The wafer is placed in a dilute hydrofluoric acid (HF) bath. The bath contains 10 parts volume water to 1 part volume HF. The wafer is etched in the HF bath for 20 minutes during which time oxygen is bubbled vigorously through the HF using a perforated teflon tube. After that, the wafer is rinsed three times in deionized (DI) water.

The silver is then removed and the wafer is cleaned in a series of wet baths. The first bath is a piranha clean which consists of 4 ml of sulfuric acid ($H_2SO_4$) to 1 ml of 49 wt % hydrogen peroxide ($H_2O_2$) at an elevated temperature around 70 °C Prior to placing the wafer into the piranha, the bath is bubbled for 2 minutes. The wafer is submerged for 2 minutes. After the piranha etch, the wafer is cleaned 3 times with DI water.

The wafer is then placed in dilute HF for 30 seconds. This HF solution has a volume ratio of 10:1 of water to 49% HF and is at room temperature. The wafer is then rinsed three times with DI water and dried with dry $N_2$ gas. This HF treatment is to remove any oxide that grew on the surface after the piranha etch.

Prior to doping, we coat the side of the wafer that we don't want to dope with a thick oxide. We often use a plasma enhanced chemical vapor deposition (PECVD) tool to deposit around 10 μm of oxide on the side of the wafer that we don't want to dope. In our tool this corresponds to 14 min 20 sec, at 300 °C, using an RF power of 20 W, 170 SCCM of silane, 710 SCCM of $N_2O$.

The wafer is then placed into a quartz boat adjacent to a source wafer. The source wafer used was from techneglass LLC and TP-250. The boat with the nanowire wafer and source wafer is loaded into a diffusion furnace with the temperature of the furnace at 800 °C The boat is loaded slowly moving 1 cm/10 seconds. The furnace is then heated up to 950 °C and the wafer is diffused for 1 hour. The furnace is then cooled to around 500 °C, and the boat and wafer are removed.

The wafer is then etched in 10% HF for around 30 minutes until the front and the back surfaces both dewet indicating that the oxide has fully etched. The wafer is then rinsed in DI water three times and dried with nitrogen gas.

3000 Å of aluminum is evaporated onto the back side of the wafer. The wafer is then placed back-side down into a rapid thermal process (RTP) system. A 4 second anneal at 835 °C is done on the wafer. The ramp up and ramp down rates are set at 30 seconds each. The sample is allowed to cool in the system before removing.

3000 Å of silver is then evaporated onto the top (nanowire) side of the wafer through a comb shaped shadow mask.

The wafer is then cleaved with a scribe into die with each die having a single comb structure.

To attach lectins to the silicon surface of the die (the sensor), we first prepare 3-(aminopropyl) triethoxysilane (APTES)/ethanol (EtOH) solution. 1% v:v APTES in a premade 95% EtOH/5% $H_2O$ solution. We allow the solution to sit for 20 min and then filter it with a 0.2 μm syringe filter. We then place the sensor into the APTES/EtOH solution for 30 min. Then we wash the sensor in EtOH for 50 seconds.

Next, we place the die in a lectin solution. We can use a galactose lectin solution with 10-100 μg/ml PHA-E lectin in 10 mM phosphate buffer solution (PBS) containing 0.2-20.0 mM. EDC and around 2.5 mM NHS. For example, 0.5 mg EDC and 0.75 mg NHS can be added to 100 uL activation buffer in an eppendorf tube and then pipetted up and down carefully to dissolve.

We allow the solution to react with the sensor for 2-3 hours at room temperature. The sensor die is now functionalized to be sensitive to galactose terminated (oligosaccharide) mAb (G1F, G2F, G1, G2).

We then measure the current-voltage response of the sensor both with and without exposing the sensor to the solution of interest and remeasure the current-voltage response.

Applications

As discussed herein, in various aspects and embodiments the biosensor uses lectins to determine glycosylation state of a protein. For example, these biosensors can be used to measure the glycosylation states of mAb.

Glycosylation state is also important in digestion and health. These sensors can be used to learn about microorganisms in the digestive tract and hence lead to a better understanding of a patient, a diagnosis of different diseases, and hence treatment options.

Different diseases have different glycosylation states and hence this sensor can be used to diagnosis disease. For example, disorders that involve immune modulation might benefit from measuring glycosylation states using these sensors. The sensors might also be useful in measuring inflammatory responses in people. The sensors could also be used to study viral immune escape or to monitor cancel cell metastasis or regulate apoptosis.

Alcoholics generally have different glycosylation patterns on their proteins than non-alcoholics, thus these sensors can be used to determining if a patient is an alcoholic.

Glycosylated components can be used to monitor the differentiation status of stem cells.

A sensor to measure glycosylation can also be used to monitor engineered cells such as CAR T cells and, for example, help select less differentiated cells that is linked to their proliferative capacity and long-term persistence to sustain sufficient anti-tumor activity. (ex. Posey, Avery D., Robert D. Schwab, Alina C. Boesteanu, Catharina Steentoft, Ulla Mandel, Boris Engels, Jennifer D. Stone et al. "Engineered CAR T cells targeting the cancer-associated Tn-glycoform of the membrane mucin MUC1 control adenocarcinoma." Immunity 44, no. 6 (2016): 1444-1454.)

Glycosylation states are also important to determine the stage of cancer progress and as an indicator of metastasis of tumors. Thus, embodiments of sensors as disclosed herein can be used to test tumors to determine their stage of progression.

Glycosylation states are also important in embryotic stem cells. Thus, embodiments of sensors as disclosed herein can be used in the production of different types of stem cells, deprogramming them (dedifferentiated) and reprogramming them.

Having thus described several aspects of at least one embodiment, it is to be appreciated various alterations, modifications, and improvements will readily occur to those skilled in the art. Such alterations, modifications, and improvements are intended to be part of this disclosure, and are intended to be within the spirit and scope of the claimed invention. Accordingly, the foregoing description and drawings are by way of example only.

The following references may be relevant to this application: (1) Sami Franssila, *Introduction to Microfabrication* (2d ed. John Wiley & Sons 2010). (2) U.S. Published Patent Application No. 2009/256134. (3) U.S. Pat. No. 8,852,981. (4) H. Galinski et al., "Agglomeration of Pt thin films on dielectric substrates," *Phys. Rev. B,* 82, 235415 (2010). (5) Feng-Ming Liu & Mino Green, "Efficient SERS substrates made by electroless silver deposition into patterned silicon structures," *J. Mater. Chem.,* 14, 1526-1532 (2004). (6) D. W. Pashley et al., "The growth and structure of gold and silver deposits formed by evaporation inside an electron microscope," *Phil. Mag.,* 10:103, 127-158 (1964). (7) Muller, Richard S., Theodore I. Kamins, Mansun Chan, and Ping K. Ko. "Device electronics for integrated circuits." (1986): 54. (8) Weste, Neil H E, and Kamran Eshraghian. "Principles of VLSI Design." A Systems Perspective 2 (1985). (9) U.S. Pat. No. 8,450,599. (10) U.S. Pat. No. 8,143,143. (11) U.S. Pat. No. 10,079,322. (12) Provisional US patent application US20170052182A1 (13) B. Ikizer, N. Orbey, and C. Lawton (2018). Formation of Poly(para-phenylene) Fibers. Materials Engineering and Sciences. Paper presented at 2018 Annual AIChE Conference, Pittsburgh, PA, October-November 2018 (14) Somasundaram, Balaji, Kristina Pleitt, Evan Shave, Kym Baker, and Linda H L Lua. "Progression of continuous downstream processing of monoclonal antibodies: Current trends and challenges." Biotechnology and Bioengineering 115, no. 12 (2018): 2893-2907. (15) Hirabayashi, Jun, Masao Yamada, Atsushi Kuno, and Hiroaki Tateno. "Lectin microarrays: concept, principle and applications." Chemical Society Reviews 42, no. 10 (2013): 4443-4458 (16) Li, Hong, Liming Wei, Pan Fang, and Pengyuan Yang. "Recent advances in the fabrication and detection of lectin microarrays and their application in glycobiology analysis." Analytical Methods 6, no. 7 (2014): 2003-2014. (17) Konstantinov, Cooney C. L. "White Paper on Continuous Bioprocessing, Journal of Pharmaceutical Sciences" J. Pharm. Sci, Vol 104: pp. 813-820, 2015. (18) Business Research Group, "Biologics Global Market Report 2020-2030: COVID19 Impact and Recovery", ID 5028647 2020. (19) E. D. Green and J. U. Baenziger, Oligosaccharide Specificities of *Phaseolus vulgaris* Leukoagglutinating and Erythroagglutinating Phytohemagglutinin, J. Biol. Chem. 262, 12018-12029, 1987, and Y. Itakura, S. Nakamura-Tsuruta, J. Kominami, N. Sharon, K. Kasai and J. Hirabayashi, "Systematic Comparison of Oligosaccharide Specificity of *Ricinus* 4 *communis* Agglutinin I and *Erythrina* Lectins: a Search by Frontal Affinity Chromatography", J. Biochem. (Tokyo), 142, 459-469, 2007, and H. Debray, D. Decout, G. Strecker, G. Spik and J. Montreuil, "Specificity of Twelve Lectins Towards Oligosaccharides and Glycopeptides Related to N-Glycosylproteins", Eur. J. Biochem, 41-55, 1981, 117, and N. Shibuya, I. J. Goldstein, J. A. Shafer, W. J. Peumans and W. F. Broekaert, "Carbohydrate Binding Properties of the Stinging Nettle (*Urtica dioica*) Rhizome Lectin" Arch. Biochem. Biophys. 249, 215-224.

All patents, patent applications, and publications mentioned in this application are hereby incorporated by reference in their entireties. However, where a patent, patent application, or publication containing express definitions is incorporated by reference, those express definitions should be understood to apply to the incorporated patent, patent application, or publication in which they are found, and not to the remainder of the text of this application, in particular the claims of this application.

What is claimed is:

1. A biosensor functionalized with lectin and that uses a photoelectric effect to determine the presence of glycoproteins.

2. The biosensor of claim 1, including a p-n junction.

3. The biosensor of claim 2, further comprising nanowires in a vertically aligned array.

4. The biosensor of claim 2, wherein the p-n junction is made out of silicon.

5. The biosensor of claim 1, wherein the biosensor is functionalized with lectins that selectively attach a glycoprotein of interest.

6. The biosensor of claim 5, wherein the glycoprotein of interest exhibits a glycosylation state of one of G0F, G1F, or G2F.

7. The biosensor of claim 1, wherein the biosensor includes subsections which are functionalized to detect different glycosylation states of interest.

8. A method of using the biosensor of claim 7, wherein electrical measurements of each of the subsections are used in combination to determine a concentration of a glycoprotein of interest.

9. A biosensor which uses photocurrent to determine a presence of uncharged molecules of interest by coupling the uncharged molecules with a charged molecule.

10. The biosensor of claim 9, wherein the uncharged molecules are oligosaccharides.

11. A sensor device comprising:

at least two electrical contacts; and silicon material including one region doped with p type dopants and another region doped with n type dopants, thus forming a p-n junction, the sensor device functionalized on a surface of the silicon material so that a passivation state of the surface of the silicon material is modified when a sample having a specific glycosylation state is present in contact with the surface of the silicon material as opposed to a passivation state of the surface of the silicon material exhibited in an absence of the sample having the specific glycosylation state.

12. The sensor device of claim 11, wherein a portion of the silicon material includes an array of nanowires.

13. The sensor device of claim 11, wherein at least one of the n-type or p-type dopants are present in a concentration of one of $10^{17}$ $cm^{-3}$, $10^{16}$ $cm^{-3}$, or $10^{15}$ $cm^{-3}$.

14. The sensor device of claim 11, wherein the device is functionalized with lectins that selectively attach a glycoprotein of interest.

15. The sensor device of claim 14, wherein the glycoprotein of interest exhibits a glycosylation state including one of G0F, G1F, or G2F.

16. The sensor device of claim 11, wherein subsections are created on the sensor which are functionalized to detect different glycosylation states of interest.

17. A method of using the sensor device of claim 16, wherein electrical measurements of each of the subsections are used in combination to determine a concentration of a glycoprotein of interest.

18. A method of using the sensor device of claim 11, by measuring electrical properties of the sensor device with and without light to determine the presence of specific glycoproteins.

* * * * *